United States Patent
Senoo et al.

(10) Patent No.: US 11,302,929 B2
(45) Date of Patent: Apr. 12, 2022

(54) METHOD FOR PRODUCING ELECTRODE CATALYST, AND ELECTRODE CATALYST

(71) Applicants: MITSUI MINING & SMELTING CO., LTD., Tokyo (JP); TOYOTA JIDOSHA KABUSHIKI KAISHA, Aichi (JP)

(72) Inventors: Yuichi Senoo, Saitama (JP); Koichi Miyake, Saitama (JP); Koji Taniguchi, Saitama (JP); Hiromu Watanabe, Saitama (JP); Naohiko Abe, Saitama (JP); Tatsuya Arai, Aichi (JP)

(73) Assignees: MITSUI MINING & SMELTING CO., LTD., Tokyo (JP); TOYOTA JIDOSHA KABUSHIKI KAISHA, Aichi (JP)

(*) Notice: Subject to any disclaimer, the term of this patent is extended or adjusted under 35 U.S.C. 154(b) by 126 days.

(21) Appl. No.: 16/091,292

(22) PCT Filed: Aug. 25, 2017

(86) PCT No.: PCT/JP2017/030606
§ 371 (c)(1),
(2) Date: Oct. 4, 2018

(87) PCT Pub. No.: WO2018/051765
PCT Pub. Date: Mar. 22, 2018

(65) Prior Publication Data
US 2019/0157688 A1    May 23, 2019

(30) Foreign Application Priority Data
Sep. 16, 2016  (JP) .................. JP2016-181693

(51) Int. Cl.
*H01M 4/92* (2006.01)
*H01M 8/1039* (2016.01)
*H01M 8/10* (2016.01)

(52) U.S. Cl.
CPC .......... *H01M 4/925* (2013.01); *H01M 4/921* (2013.01); *H01M 8/1039* (2013.01); *H01M 2008/1095* (2013.01); *Y02E 60/50* (2013.01); *Y02P 70/50* (2015.11)

(58) Field of Classification Search
None
See application file for complete search history.

(56) References Cited

U.S. PATENT DOCUMENTS

| | | | | |
|---|---|---|---|---|
| 7,629,072 | B2* | 12/2009 | Cho | H01M 4/921 429/483 |
| 2004/0038808 | A1 | 2/2004 | Hampden-Smith et al. | |
| 2008/0254974 | A1 | 10/2008 | Nakano et al. | |
| 2010/0081036 | A1* | 4/2010 | Pak | B01J 21/18 429/482 |
| 2010/0233574 | A1* | 9/2010 | Masao | H01M 4/92 429/487 |
| 2013/0053239 | A1 | 2/2013 | Carpenter | |
| 2013/0085061 | A1 | 4/2013 | Stamenkovic et al. | |
| 2015/0303459 | A1 | 10/2015 | Kovalenko et al. | |
| 2017/0141407 | A1* | 5/2017 | Taniguchi | H01M 4/925 |

FOREIGN PATENT DOCUMENTS

| | | |
|---|---|---|
| CN | 105244511 A | 1/2016 |
| JP | 2002-280002 A | 9/2002 |
| JP | 2006-253042 A | 9/2006 |
| JP | 2006-524898 A | 11/2006 |
| JP | 2008 243436 A | 10/2008 |
| JP | 2016-501427 A | 1/2016 |
| KR | 10 0988681 B1 | 10/2008 |
| WO | 2004/095603 A2 | 11/2004 |
| WO | 2015/146454 A1 | 10/2015 |
| WO | WO 2015/151714 * | 10/2015 |
| WO | 2016/098399 A1 | 4/2017 |

OTHER PUBLICATIONS

Elezovic et al. "Pt nanoparticles on tin oxide based support as a beneficial catalyst for oxygen reduction in alkaline solutions." RSC Adv., 2015, 5, 15923 (Year: 2015).*
Katsuyoshi K. et al.: "Synthesis and Evaluation of Pt Catalyst Supported on the Highly durable Oxide for PEFC", Fuel Cell Nanomaterials Center, University of Yamanashi, The 23rd FCDIC Fuel Cell Symposium Proceedings, pp. 192-195, Published on May 26, 2016, Planned by FCDIC Symposium Committee, Published by Fuel Cell Development information Center (FCDIC) Printed by NIHON.
International Search Report, dated Nov. 14, 2017, from corresponding PCT/JP2017/030606 application.
Huang et al., "High-performance transition metal-dope Pt3Ni octahedra for oxygen reduction reaction,"Science Magazine, Jun. 12, 2015, vol. 348, issue 6240.
Park, K-W and Seol, K-S, "Nb-TiO2 supported Pt cathode catalyst for polymer electrolyte membrane fuel cells," Electrochemistry Communications 9 (2007) 2256-2260.
Zhang, Na et al., "Tin dioxide facilitated truncated octahedral Pt3Ni alloy catalyst: synthesis and ultra highly active and durable electrocatalysts for oxygen reduction reaction," RSC Adv., 2016, 6, 26323.

* cited by examiner

*Primary Examiner* — Alix E Eggerding
(74) *Attorney, Agent, or Firm* — Nixon & Vanderhye

(57) ABSTRACT

Provided is a method with which it is possible to easily produce an electrode catalyst having excellent catalytic performance such as kinetically controlled current density. The method involves: a dispersion liquid preparation step of preparing a dispersion liquid by mixing (i) at least one type of solvent selected from the group consisting of sulfoxide compounds and amide compounds, (ii) a catalyst carrier powder constituted by a metal oxide, (iii) a platinum compound, (iv) a transition metal compound, and (v) an aromatic compound including a carboxyl group; and a loading step of heating the dispersion liquid to thereby load a platinum alloy of platinum and a transition metal on a surface of the catalyst carrier powder.

7 Claims, No Drawings

METHOD FOR PRODUCING ELECTRODE CATALYST, AND ELECTRODE CATALYST

TECHNICAL FIELD

The present invention relates to a method for producing an electrode catalyst suitably used in a fuel cell. The invention also relates to an electrode catalyst.

BACKGROUND ART

A polymer electrolyte fuel cell includes a membrane-electrode assembly including: a membrane of a proton-conducting polymer, such as a perfluoroalkyl sulfonate polymer, as a solid electrolyte; and an air electrode and a fuel electrode formed by applying respective electrode catalysts to both surfaces of the solid polymer membrane.

Electrode catalysts are generally composed of an electroconductive carbon material, such as carbon black, serving as a carrier and one of various types of noble metal catalysts, such as platinum, loaded on the surface of the carrier. It is known that electrode catalysts involve a problem that the carbon undergoes oxidative corrosion due to changes in potential during operation of the fuel cell, eventually causing the loaded metal catalyst to agglomerate or fall off. As a result, the performance of the fuel cell deteriorates with the operation time. So, in producing a fuel cell, a larger-than-actually-necessary amount of noble metal catalyst is loaded onto the carrier, to thereby provide some leeway to performance and increase product life. This method, however, is not economically advantageous.

Various studies have been conducted on electrode catalysts aiming at improving the performance, longevity, and economical efficiency of polymer electrolyte fuel cells. For example, a technique (see Patent Literature 1) proposes the use of an electroconductive oxide, that is a non-carbonaceous material, as a carrier in place of a conventionally employed electroconductive carbon. In Patent Literature 1, tin oxide is used as a carrier of an electrode catalyst. Fine particles of a noble metal, such as platinum, are loaded on the surface of the carrier. Patent Literature 1 mentions that the electrode catalyst has excellent electrochemical catalytic activity and high durability.

CITATION LIST

Patent Literature

Patent Literature 1: US 2010233574 A1

SUMMARY OF INVENTION

Inventors studied the performance of the electrode catalyst disclosed in Patent Literature 1, and found that there is still room for improvement in catalytic performance such as kinetically controlled current density. Inventors thus came up with the idea of improving the catalytic performance of an electrode catalyst by loading, on tin oxide, a platinum-nickel alloy having a higher catalytic activity than platinum, and attempted, by employing the method disclosed in Patent Literature 1, to produce an electrode catalyst in which a platinum-nickel alloy was loaded on the surface of tin oxide. Unfortunately, a desired catalytic performance could not be obtained by producing an electrode catalyst in which a platinum-nickel alloy was loaded on the surface of tin oxide according to the method disclosed in Patent Literature 1.

An objective of the invention is to provide a method with which it is possible to produce an electrode catalyst capable of overcoming the various drawbacks of the aforementioned conventional art.

The present invention provides a method for producing an electrode catalyst, comprising:

a dispersion liquid preparation step of preparing a dispersion liquid by mixing (i) at least one type of solvent selected from the group consisting of sulfoxide compounds and amide compounds, (ii) a catalyst carrier powder constituted by a metal oxide, (iii) a platinum compound, and (iv) a transition metal compound; and a loading step of heating the dispersion liquid to thereby load a platinum alloy of platinum and a transition metal on a surface of the catalyst carrier powder.

The present invention provides an electrode catalyst in which a platinum alloy of platinum and a transition metal is loaded on a tin oxide carrier, wherein:

in a diffraction pattern obtained by subjecting the electrode catalyst to an X-ray diffraction measurement, a diffraction angle 2θ at a peak of a (200) plane of the platinum alloy is from 46.5° to 48.0°; and a metallization rate of Sn, as defined by equation (1) below, in an analysis region on the electrode catalyst's surface and a vicinity of the surface as measured by X-ray photoelectron spectroscopy is 5% or less:

$$\text{metallization rate of Sn (\%)} = R_{Sn\text{-}metal}/(R_{Sn\text{-}metal} + R_{Sn\text{-}oxide}) \times 100 \quad \text{(Eq. 1)},$$

wherein $R_{Sn\text{-}metal}$ is an area that Sn metal occupies in a spectrum ascribable to the Sn 3 $d_{5/2}$ orbit as measured by X-ray photoelectron spectroscopy, and $R_{Sn\text{-}oxide}$ is an area that Sn oxide occupies in a spectrum ascribable to the Sn 3 $d_{5/2}$ orbit as measured by X-ray photoelectron spectroscopy.

DESCRIPTION OF EMBODIMENTS

The invention is described below according to preferred embodiments thereof. An electrode catalyst to be produced in the present invention has a structure in which a catalyst is loaded on the surface of a carrier. For the carrier, an electroconductive metal oxide is suitably used. In the invention, "electroconductive" means that the volume resistivity of a metal oxide under a pressure of 57 MPa is $1 \times 10^4$ Ω·cm or less. For the catalyst to be loaded on the surface of the carrier, a platinum alloy of platinum and a transition metal is suitably used. An electrode catalyst produced according to the method of the invention is suitably used as a catalyst in various types of fuel cells. A typical example of a fuel cell is a polymer electrolyte fuel cell.

The production method of the invention involves: a dispersion liquid preparation step of preparing a dispersion liquid by mixing (i) at least one type of solvent selected from the group consisting of sulfoxide compounds and amide compounds, (ii) a catalyst carrier powder constituted by a metal oxide, (iii) a platinum compound, and (iv) a transition metal compound; and a loading step of heating the dispersion liquid to thereby load a platinum alloy of platinum and a transition metal on a surface of the catalyst carrier powder.

As described above, an electrode catalyst having a desired catalytic activity cannot be obtained by attempting to load a platinum alloy of platinum and a transition metal on a metal oxide carrier according to the method disclosed in Patent Literature 1. Inventors studied the cause of this problem, and found the cause to be as follows. In the method disclosed in Patent Literature 1, it is necessary to subject a sample, in which a platinum compound and a transition metal compound are loaded on a metal oxide, to a heat treatment at high temperatures, such as at 200° C. or higher, in a reducing atmosphere with the aim of solid-soluting the transition metal into platinum. During the heat treatment, platinum is alloyed not only with the transition metal but also with the metal in the metal oxide constituting the carrier.

Further, as a result of diligent research, Inventors have found that, according to the production method of the present invention, it is possible to obtain an electrode catalyst having excellent catalytic performance. Inventors believe the reason for this is that, by heating a dispersion liquid in the production method of the present invention, the platinum compound and the transition metal compound are reduced at a lower temperature due to the reducing action of the solvent, and thus it is possible to produce an alloy therebetween at an even lower temperature while being able to suppress alloying of platinum with the metal element in the metal oxide constituting the catalyst carrier.

The production method of the invention is broadly divided into (a) the dispersion liquid preparation step and (b) the loading step. Each step is described in detail below.

In the dispersion liquid preparation step (a), the dispersion liquid is prepared by mixing the following components (i) to (iv) as constituent components:
 (i) at least one type of solvent selected from the group consisting of sulfoxide compounds and amide compounds;
 (ii) a catalyst carrier powder constituted by a metal oxide;
 (iii) a platinum compound; and
 (iv) a transition metal compound.

For example, the components (i) to (iv) can be placed in a container etc. in one batch and be mixed. Alternatively, the components (ii) to (iv) can be added to and mixed with the component (i). The order of addition is not critical in the invention, and the order of addition can be determined as appropriate depending on the state/condition of the components and the blending ratio.

In the dispersion liquid preparation step, it is preferable to add the at least one type of solvent (i) selected from the group consisting of sulfoxide compounds and amide compounds such that the percentage of the solvent(s) with respect to the total mass of the dispersion liquid to be prepared is preferably from 30 to 99.9 mass %, more preferably from 40 to 99.7 mass %, even more preferably from 50 to 99 mass %. It should be noted that the dispersion liquid may include solvents other than the aforementioned solvent in amounts that achieve the effect of the invention.

In the dispersion liquid preparation step, it is preferable to add the catalyst carrier powder (ii) constituted by a metal oxide such that the percentage of the carrier powder with respect to the volume of the solvent of the dispersion liquid to be prepared is preferably from 0.1 to 500 g/L, more preferably from 1 to 150 g/L, even more preferably from 2 to 100 g/L.

In the dispersion liquid preparation step, it is preferable to add the platinum compound (iii) such that the percentage of the platinum compound with respect to the volume of the solvent of the dispersion liquid to be prepared is preferably from $2.5\times10^{-4}$ to 1.2 mol/L, more preferably from $6.0\times10^{-4}$ to $8.0\times10^{-1}$ mol/L, even more preferably from $1.5\times10^{-3}$ to $8.0\times10^{-2}$ mol/L.

In the dispersion liquid preparation step, it is preferable to add the transition metal compound (iv) such that the percentage of the transition metal compound with respect to the volume of the solvent of the dispersion liquid to be prepared is preferably from $4.0\times10^{-4}$ to $2.0\times10^{-1}$ mol/L, more preferably from $6.0\times10^{-4}$ to $1.2\times10^{-1}$ mol/L, even more preferably from $2.0\times10^{-3}$ to $6.0\times10^{-2}$ mol/L.

In the dispersion liquid preparation step, an aromatic compound including a carboxyl group may further be mixed in addition to the aforementioned components. By including an aromatic compound including a carboxyl group in the dispersion liquid, the reduction of platinum and the transition metal is performed even more smoothly in the loading step (b), and thus, the solid-soluted state of the alloy becomes even more uniform. As a result, the catalytic performance of the electrode catalyst to be obtained is further improved.

In the dispersion liquid preparation step, it is preferable to add the aforementioned aromatic compound including a carboxyl group such that the percentage of the aromatic compound with respect to the volume of the solvent of the dispersion liquid to be prepared is preferably from $4.0\times10^{-4}$ to 4.0 mol/L, more preferably from $2.0\times10^{-2}$ to 3.0 mol/L, even more preferably from $4.0\times10^{-2}$ to 2.0 mol/L.

In the dispersion liquid preparation step, the at least one type of solvent (i) selected from the group consisting of sulfoxide compounds and amide compounds is used as a solvent for dissolving the platinum compound (iii) and the transition metal compound (iv). The solvent also serves as a reducing agent for reducing the platinum compound (iii) and the transition metal compound (iv). From these viewpoints, examples of usable sulfoxide compound solvents (i) may include dimethylsulfoxide, and examples of amide compound solvents may include: lactam compounds (intramolecular cyclic amide compounds) such as N-methyl-2-pyrrolidone, N-ethyl-2-pyrrolidone, N-propyl-2-pyrrolidone and N-hydroxyethyl-2-pyrrolidone; and N,N-dimethylformamide, N-methylformamide, N,N-diethylformamide, N-ethylformamide, N,N-dimethylacetamide, and N,N-diethylacetamide. Among the above, an organic compound solvent including a formamide group as one type of amide compound, such as formamide, N,N-dimethylformamide, N-methylformamide, N,N-diethylformamide or N-ethylformamide, is preferable for easily forming an electrode catalyst having excellent catalytic performance such as kinetically controlled current density. One type of the aforementioned solvent may be used alone, or two or more types may be used in combination.

In the dispersion liquid preparation step, the catalyst carrier powder (ii) constituted by a metal oxide is an aggregate of particles of a carrier constituted by a metal oxide (referred to hereinafter also as "carrier particles"). Electroconductive metal oxide particles may be used for the carrier particles. Examples of electroconductive metal oxides include indium-based oxides, tin-based oxides, titanium-based oxides, zirconium-based oxides, selenium-based oxides, tungsten-based oxides, zinc-based oxides, vanadium-based oxides, tantalum-based oxides, niobium-based oxides and rhenium-based oxides. Examples of preferable inorganic oxides include oxides wherein at least one type of element selected from halogens, such as fluorine and chlorine, niobium, tantalum, antimony and tungsten, is included in tin oxide. Concrete examples include metal- or non-metal containing (or doped) tin oxides, such as tin-containing indium oxides, titanium-containing tin oxides, antimony-containing tin oxides, fluorine-containing tin oxides, tantalum-containing tin oxides, antimony and tantalum-containing tin oxides, tungsten-containing tin oxides, fluorine and tungsten-containing tin oxides and niobium-containing tin oxides. Particularly, from the viewpoint of substance stability in a power-generating environment of the polymer electrolyte fuel cell, it is preferable that the carrier particles are made of a ceramic material including tin oxide. Examples of tin oxides include $SnO_2$, which is an oxide of tetravalent tin, and SnO, which is an oxide of bivalent tin. Particularly, from the viewpoint of improving acid resistance, it is preferable that the tin oxides mainly include $SnO_2$. The expression "mainly include $SnO_2$" means that at least 50 mol % of the tin included in the tin oxides is constituted by $SnO_2$.

The carrier particles constituted by an electroconductive metal oxide can be produced according to various methods. The production methods can be broadly divided into wet methods and dry methods. Wet methods are advantageous from the viewpoint of producing fine carrier particles. It is preferable to employ the method described below as an example of a wet method for producing carrier particles constituted by halogen-containing tin oxide. Details of this production method are described in WO2016/098399, for example.

In cases where the metal oxide is tin oxide and the tin-oxide carrier particles include at least one type of element selected from Nb, Ta, Sb and W, taking tungsten (W) as an example of the included element, the content by percentage as expressed by W (mol)/(Sn (mol)+W (mol))×100 is preferably from 0.1 to 30 mol %, more preferably from 1 to 10 mol %, from the viewpoint of sufficiently and efficiently improving the electroconductivity of tin oxide. In cases where two or more types of elements are selected from Nb, Ta, Sb and W, it is preferable that the total amount thereof is within the aforementioned range. The content by percentage is calculated by: dissolving the electrode catalyst and making it into a solution according to an appropriate method; and measuring the tin concentration and the concentration of the added element(s) by analyzing the solution by ICP mass spectrometry. Instead of ICP mass spectrometry, fluorescent X-ray analysis (XRF) may be employed.

In cases where the metal oxide is tin oxide and the tin oxide includes a halogen atom such as fluorine and/or chlorine, taking fluorine (F) as an example of the included element, the content by percentage as expressed by F (mol)/(Sn (mol)+F (mol))×100 is preferably from 0.07 to 5.70 mol %, more preferably from 1.50 to 5.30 mol %, from the viewpoint of sufficiently and efficiently improving the electroconductivity of tin oxide. In cases where two or more types of elements are selected from halogen atoms, it is preferable that the total amount thereof is within the aforementioned range. The content of the halogen atom(s) can be measured by employing combustion-ion chromatography (e.g., an automated sample combustion ion chromatograph (AQF-2100H) from Mitsubishi Chemical Analytech Co., Ltd.).

The carrier particles may be in a dispersed state where the primary particles are independently separated. Alternatively, the particles may be secondary particles consisting of agglomerations of a plurality of primary particles. In cases where the particles are agglomerations, the particles may be amorphous wherein an indefinite number of particles have gathered randomly. Alternatively, a chain-like structure section may be formed wherein a plurality of particles are beaded together. The shape of the primary particles is not particularly limited, and may have various shapes, such as spherical, polyhedric, plate-shaped, spindle-shaped, or a combination thereof. Spherical particles are particularly preferable. The particle size of a primary particle constituting the carrier particles, i.e., the particle size of an object found to be the smallest unit as a particle as judged by the geometrical shape from the outer appearance, is preferably from 5 to 200 nm, more preferably from 5 to 100 nm, and even more preferably from 5 to 50 nm, from the viewpoint of being able to increase the specific surface area of the electrode catalyst carrier. The primary particle size of the carrier can be found from the average value of primary particle diameters of the carrier as measured in an electron microscope image or by small-angle X-ray scattering.

In the dispersion liquid preparation step, for the platinum compound (iii), it is preferable to use a compound dissolvable in the at least one type of solvent (i) selected from the group consisting of sulfoxide compounds and amide compounds, but the compound is not limited thereto. For example, platinum complexes or platinum salts can be used for the platinum compound (iii). Concrete examples of platinum compounds include bis(acetylacetonato)platinum (II) which is a type of platinum complex, hexachloroplatinic (IV) acid, tetrachloroplatinic(II) acid, dinitrodiammineplatinum(II), tetraammineplatinum(II) dichloride hydrate, and hexahydroxoplatinic(IV) acid.

In the dispersion liquid preparation step, for the transition metal compound (iv), it is preferable to use a compound dissolvable in the at least one type of solvent (i) selected from the group consisting of sulfoxide compounds and amide compounds, but the compound is not limited thereto. For example, transition metal complexes or transition metal salts can be used for the transition metal compound (iv). Examples of transition metals include, although not limited to, nickel, cobalt, iron, chromium, titanium, vanadium, manganese, copper, zinc, and scandium. One type of transition metal compound may be used alone, or two or more types may be used in combination. Of the aforementioned transition metals, it is preferable to use a compound of nickel, cobalt, iron or chromium, from the viewpoint that an alloy with platinum has high catalytic activity. Hereinbelow, a transition metal is also referred to simply as "M".

Examples of transition metal compounds include bis(2, 4-pentane dionato)nickel(II) which is a type of nickel complex, bis(hexafluoroacetylacetonato)nickel(II), and nickel acetate.

In the dispersion liquid preparation step, the additionally used aromatic compound including a carboxyl group is a compound that includes: at least one aromatic ring; and at least one carboxyl group that is directly bonded to the aromatic ring or indirectly bonded via a bonding group. Examples of aromatic rings include a benzene ring, a naphthalene ring, and an anthracene ring. An aromatic hetero ring including at least one nitrogen or oxygen is also encompassed within the category of the aromatic ring. Concrete examples of aromatic compounds including a carboxyl group include benzoic acid, phthalic acid, terephthalic acid, salicylic acid, and acetylsalicylic acid. One type of the aromatic compound may be used alone, or two or more types may be used in combination.

By including, in the dispersion liquid, the additionally used aromatic compound including a carboxyl group, the reduction of platinum and the transition metal is performed even more smoothly in the loading step (b), and thus, the solid-soluted state of the alloy becomes even more uniform. As a result, the catalytic performance of the electrode catalyst to be obtained is further improved.

By subjecting the dispersion liquid prepared by using the aforementioned components to the loading step (b), a catalyst made of a platinum alloy of platinum and a transition metal is loaded on the surface of the particles of the catalyst carrier powder. Loading of the catalyst is achieved by heating the dispersion liquid. Stated differently, in the loading step, heating of the dispersion liquid causes pyrolysis of the platinum compound and the transition metal compound included in the dispersion liquid, and the platinum and the transition metal are reduced to thereby produce an alloy thereof. The produced platinum alloy adheres to the surface of the carrier particles, thereby yielding the electrode catalyst to be obtained.

It is preferable that, before heating the dispersion liquid in the loading step, the components included in the dispersion liquid are dispersed uniformly and sufficiently, from the viewpoint of uniformly loading the catalyst on the surface of the carrier particles. With this aim, it is preferable to subject the dispersion liquid to a dispersion treatment by applying ultrasonic waves before heating the dispersion liquid in the loading step. It is preferable to perform the dispersion treatment with ultrasonic waves in a non-heated state, preferably at a temperature from 15° C. to 25° C., for example.

In the loading step, heating of the dispersion liquid can be performed in open air under atmospheric pressure, or can alternatively be performed in a hermetically sealed state. In cases of performing heating in open air under atmospheric pressure, heating may be performed while refluxing volatile components. Further, heating of the dispersion liquid can be performed in various types of atmospheres. For example, heating can be performed in an oxygen-containing atmosphere such as ambient air, or in an inert gas atmosphere such as argon or nitrogen. From the viewpoint of suppressing, as much as possible, a reduction in the activity of the catalyst loaded on the carrier particles, it is preferable to heat the dispersion liquid in an inert gas atmosphere.

In the loading step, the heating temperature of the dispersion liquid is preferably below the melting point of the metal element in the metal oxide, from the viewpoint of easily preventing agglomeration of the metal oxide. For example, in cases where the metal oxide is tin oxide, it is preferable that the heating temperature of the dispersion liquid is below 231.9° C. which is the melting point of tin. The reason for this is considered that, by setting the temperature below the melting point, alloying of platinum with tin in the tin oxide, which constitutes the catalyst carrier, can be suppressed even more effectively.

Further, from the viewpoint of further improving the catalytic performance of the electrode catalyst, it is particularly preferable that the heating temperature of the dispersion liquid is from 120° C. or higher to below 160° C.

The reason that the catalytic performance of the electrode catalyst is improved is considered to be that, although reduction is generally performed at high temperatures to promote the alloying between platinum and a transition metal, setting the heating temperature of the dispersion liquid below 160° C. in the production method of the invention reduces the difference between the platinum's reductive deposition rate and the transition metal's reductive deposition rate, which thereby facilitates the transition metal to be taken into the platinum, thus making the solid-soluted state of the alloy even more uniform. Further, it is considered that setting the heating temperature of the dispersion liquid to 120° C. or higher promotes the reduction of platinum and the transition metal, and thus, the loading rate of the platinum alloy on the catalyst carrier can be increased, which results in an improvement in the catalytic performance of the electrode catalyst. From these viewpoints, it is even more preferable that the heating temperature is from 120° C. to 145° C.

On condition that the aforementioned heating temperature is satisfied, it is preferable that the heating time is from 3 to 100 hours, more preferably from 6 to 100 hours, even more preferably from 12 to 72 hours.

In the loading step, the platinum alloy, which is the catalyst, is loaded such that the amount of the catalyst loaded with respect to the total mass of the electrode catalyst is preferably from 0.1 to 50 mass %, more preferably from 1 to 30 mass %. The load amount of the catalyst can be adjusted by appropriately adjusting the concentrations of the metal-oxide catalyst carrier powder, the platinum compound, and the transition metal compound in the dispersion liquid preparation step and controlling, for example, the heating temperature and heating time in the loading step.

Once the catalyst is loaded on the surface of the carrier particles in the loading step (b), next, a solid-liquid separation step is performed. In this step, an electrode catalyst, which is the dispersoid, is separated from the dispersion liquid after the loading step. This step yields an electrode catalyst, which is a catalyst powder in which a platinum alloy of platinum and a transition metal is loaded on a catalyst carrier powder. For this solid-liquid separation step, various known solid-liquid separation means can be used without particular limitation. Examples include filtration using a filter, centrifugal separation, and decantation.

According to the aforementioned method, an electrode catalyst having excellent catalytic performance, such as kinetically controlled current density, can be produced easily. The electrode catalyst is, for example, in a powder state. The electrode catalyst obtained according to the above has a structure in which a platinum alloy of platinum and a transition metal (referred to hereinafter also as "Pt-M alloy") is loaded on a carrier constituted by a metal oxide. The presence of the Pt-M alloy on the surface of the carrier can be verified by a transmission electron microscope (TEM), for example. It should be noted that "Pt-M alloy" may be an alloy further including another metal solid-soluted in the Pt-M alloy; for example, in cases where the metal oxide constituting the catalyst carrier is tin oxide, the alloy may include a Pt-M-Sn alloy in which platinum is alloyed not only with the transition metal but also with tin contained in the tin oxide.

Inventors diligently studied the catalytic activity of an electrode catalyst produced according to a conventional production method, the electrode catalyst having a Pt-M alloy loaded on a carrier employing tin oxide as a metal oxide. Inventors, as a result, found that, at the time of loading the Pt-M alloy on tin oxide, a portion of the tin oxide was reduced during the loading process to produce metal tin, and the metal tin was taken into the Pt-M alloy, thus resulting in a deterioration in catalytic activity of the Pt-M alloy. Further, it was found that, in cases of using tin oxide as a metal oxide, catalytic activity can be improved by reducing, as much as possible, solid-soluting of metal tin originating from the carrier into the Pt-M alloy. Further research revealed that catalytic activity can be improved effectively by setting the metallization rate (%) of Sn (percentage of Sn metal with respect to the total of the Sn element), as defined by equation (1) below, in an analysis region on the electrode catalyst's surface and the vicinity of the surface to equal to or below a specific value (5%). Such an electrode catalyst can be produced simply through the production method of the present invention.

Accordingly, it is preferable that, in the electrode catalyst in which a platinum alloy of platinum and a transition metal is loaded on a tin oxide carrier, the metallization rate of Sn, as defined by equation (1) below, in an analysis region on the electrode catalyst's surface and the vicinity of the surface as measured by X-ray photoelectron spectroscopy is preferably 5% or less, more preferably 3% or less.

Metallization rate of Sn $(\%) = R_{Sn\text{-}metal}/(R_{Sn\text{-}metal} + R_{Sn\text{-}oxide}) \times 100$ (Eq. 1).

In the equation, $R_{Sn\text{-}metal}$ is an area that Sn metal occupies in a spectrum ascribable to the Sn 3 $d_{5/2}$ orbit as measured by X-ray photoelectron spectroscopy, and $R_{Sn\text{-}oxide}$ is an area that Sn oxides occupy in a spectrum ascribable to the Sn 3 $d_{5/2}$ orbit as measured by X-ray photoelectron spectroscopy.

Herein, "an analysis region on the surface and the vicinity of the surface" refers to a region, in the depth direction, that is subjected to analysis when the electrode catalyst is measured by X-ray photoelectron spectroscopy (XPS). In general, the measurement distance by XPS in the depth direction, i.e., the analysis region on the surface and the vicinity of the surface, is a region from 0 to 5 nm toward the depth direction from the surface. Specifically, the metallization rate (%) of Sn is found as the percentage of the area of a spectrum ascribable to Sn metal with respect to the area of the entire spectrum of Sn 3 $d_{5/2}$.

In the invention, preferably, XPS is measured under the following conditions (A1) to (A5).

(A1) X-ray source: Al Kα (hv=1486.6 eV).
(A2) Angle between sample and detector: θ=45°.
(A3) Calibration of detector: Performed using Cu2p and Au4f.
(A4) Analysis region: 0.1-mm-dia. circle.
(A5) Chamber pressure during analysis: In the order of $10^{-7}$ to $10^{-6}$ Pa.

Further, in the electrode catalyst in which a platinum alloy of platinum and a transition metal is loaded on a tin oxide carrier, it is preferable that, in a diffraction pattern obtained by subjecting the electrode catalyst to an X-ray diffraction measurement, the diffraction angle 2θ at a peak of a (200) plane of the platinum alloy is within a specific range (from 46.5° to 48.0°). In the electrode catalyst, reflecting the fact that a Pt-M alloy (M represents a transition metal) is loaded on a carrier, the diffraction angle 2θ at a peak of a (200) plane of the platinum alloy is shifted from 46.2° for elemental platinum toward the high-angle side in the diffraction pattern obtained by X-ray diffraction measurement of the electrode catalyst. More specifically, the diffraction angle 2θ at the aforementioned peak for the platinum alloy in the diffraction pattern is preferably 46.5° or greater; in this way, it is possible to achieve an effect of improving catalytic activity due to alloying. Further, the diffraction angle 2θ at the aforementioned peak for the platinum alloy is preferably 48.0° or less. On the high-angle side of 48.0°, solid-soluting of the transition metal into Pt progresses excessively (in cases where the transition metal is Ni, the molar concentration of Ni in the alloy exceeds 50%), and thus catalytic activity deteriorates. Thus, it is advantageous to set the diffraction angle to 48.0° or less so that high catalytic activity can be maintained. Considering these points, it is preferable that the diffraction angle 2θ at the aforementioned peak for the platinum alloy is preferably from 46.5° to, 48.0°, more preferably from 46.8° to 47.7°. The diffraction angle 2θ at the aforementioned peak for the platinum alloy can be set to the aforementioned value by simply controlling the heating temperature in the loading step and adjusting the amount of the platinum compound and the transition metal compound added in the aforementioned method for producing the electrode catalyst. The reason that the degree of peak shift is evaluated at the (200) plane is because it is possible to avoid overlapping with the diffraction peak ascribable to tin oxide, which is the carrier, allowing easy analysis.

From the viewpoint of improving catalytic activity, it is preferable that the molar ratio Pt/M between platinum (Pt) and the transition metal (M) in the electrode catalyst is 1 or greater. It is also preferable that the molar ratio Pt/M is 10 or less, from the viewpoint of increasing the alloying rate of the platinum alloy to improve catalytic activity. Considering these points, the molar ratio Pt/M is preferably from 1 to 10, more preferably from 1 to 7. From the viewpoint of improving catalytic activity, the total load amount of the platinum alloy of platinum and the transition metal, which is the catalyst, with respect to the total mass of the electrode catalyst is preferably from 0.1 to 50 mass %, more preferably from 1 to 30 mass %. The load amount of platinum and the transition metal can be found by: dissolving the electrode catalyst and making it into a solution according to an appropriate method; and analyzing the solution by ICP mass spectrometry. The load amount of the platinum alloy of platinum and the transition metal can be found as the total value of the load amount of platinum and the load amount of the transition metal.

It is advantageous that the Pt-M alloy is loaded on the surface of the carrier in the form of fine particles. For example, the particle size of the Pt-M alloy particle is preferably from 1 to 20 nm, more preferably from 1 to 10 nm, even more preferably from 1 to 5 nm. Loading a Pt-M alloy having a particle size within the aforementioned range is advantageous in that elution of the alloy during the progress of the electrode reaction can be prevented effectively, and also a reduction in the specific surface area of the alloy can be prevented effectively. The particle size of the Pt-M alloy can be from the average value of particle diameters of the Pt-M alloy as measured in an electron microscope image or by small-angle X-ray scattering.

Depending on the amount of Pt-M alloy loaded, the Pt-M alloy may uniformly cover the entire region of the surface of the carrier, or may cover the surface of the carrier such that a portion thereof is exposed. In cases of covering the carrier surface such that a portion of the surface is exposed, for example, only a single section of the surface may be covered. In this case, however, if the reaction area of the alloy catalyst is too large with respect to the oxygen diffusion amount in the oxygen reduction reaction, then oxygen diffusion becomes rate-determining, which may result in that the originally intended catalytic activity cannot be achieved sufficiently. Therefore, it is better to perform covering in an intermittent manner at appropriate intervals to expose the carrier surface.

An electrode catalyst obtained by the production method of the present invention and the electrode catalyst of the present invention can be used, for example, by being included in at least one of an air electrode and a fuel electrode in a membrane-electrode assembly including the air electrode arranged on one surface of a solid polymer electrolyte membrane and the fuel electrode arranged on the other surface. Preferably, the electrode catalyst can be included in both the air electrode and the fuel electrode.

Particularly, the air electrode and the fuel electrode each preferably include a catalyst layer including the electrode catalyst of the invention, and a gas diffusion layer. In order to cause the electrode reaction to progress smoothly, it is preferable that the electrode catalyst is in contact with the solid polymer electrolyte membrane. The gas diffusion layer functions as a supporting charge collector having a charge-collecting function, and also functions to sufficiently supply gas to the electrode catalyst. For the gas diffusion layer, it is possible to use a material conventionally used in this technical field. For example, it is possible to use carbon paper or carbon cloth, which is a porous material. Specifically, the gas diffusion layer can be formed by a carbon cloth woven with a thread including, at a predetermined ratio, carbon fiber having a surface coated with polytetrafluoroethylene for example, and uncoated carbon fiber.

For the solid polymer electrolyte, it is possible to use a material conventionally used in this technical field. Examples include perfluorosulfonic acid polymer-based proton conductor films, films in which a hydrocarbon-based polymer compound is doped with an inorganic acid such as phosphoric acid, organic/inorganic hybrid polymers in which a portion is substituted by a functional group of a proton conductor, and proton conductors in which a polymer matrix is impregnated with a phosphoric acid solution or a sulfuric acid solution.

The membrane-electrode assembly is provided with separators arranged on the respective surfaces thereof, and is thereby made into a polymer electrolyte fuel cell. For the separator, it is possible to use a member that has, on the surface opposing the gas diffusion layer for example, a plurality of projections (ribs) extending along one direction and formed at predetermined intervals. The spaces between adjacent projections form grooves having a rectangular cross section. The grooves are employed as flow paths for supplying/discharging a fuel gas and an oxidant gas such as air. The fuel gas and the oxidant gas are respectively supplied from a fuel gas supply means and an oxidant gas supply means. It is preferable that the separators arranged on the respective surfaces of the membrane-electrode assembly are arranged such that the grooves formed therein are orthogonal to one another. The aforementioned structure constitutes the smallest unit in a fuel cell, and a fuel cell can be constituted by a cell stack made by arranging a few dozen to a few hundred of these structures side by side.

The invention has been described above according to preferred embodiments thereof, but the invention is not limited to the foregoing embodiments. For example, the foregoing embodiments mainly describe examples in which the electrode catalyst produced according to the method of the invention is used as an electrode catalyst of a solid polymer electrolyte fuel cell, but the electrode catalyst produced according to the method of the invention can be used as an electrode catalyst in various types of fuel cells other than solid polymer electrolyte fuel cells, such as alkaline fuel cells, phosphoric acid fuel cells, and direct methanol fuel cells.

EXAMPLES

The invention is described in further detail below according to Examples. The scope of the invention, however, is not limited to the following Examples. Unless specifically stated otherwise, "%" refers to "mass %". It should be noted that, in the following description, the primary particle size of the carrier and the percentages of W and F in the carrier are measured according to the aforementioned methods.

Example 1

(1) Carrier Production Step:

Fluorine-and-tungsten-containing tin oxide particles having a primary particle size of 20 nm were obtained according to Example 1 described in WO2016/098399. The tin oxide in the particles mainly included $SnO_2$. In the fluorine-and-tungsten-containing tin oxide particles, the content by percentage of fluorine expressed by $F(mol)/(Sn(mol)+F(mol)+W(mol))\times 100$ calculated according to the aforementioned method was 3.8 mol %, and the content by percentage of tungsten expressed by $W(mol)/(Sn(mol)+F(mol)+W(mol))\times 100$ calculated according to the aforementioned method was 2.5 mol %.

(2) Dispersion Liquid Preparation Step:

In a 500-mL volumetric flask were placed 337 mL of N,N-dimethylformamide (DMF; 049-32363; Wako Pure Chemical Industries, Ltd.), $9.87\times 10^{-3}$ mol/$L_{-DMF}$ of bis(acetylacetonato)platinum(II) (Pt(acac)$_2$; 028-16853; Wako Pure Chemical Industries, Ltd.), $7.40\times 10^{-3}$ mol/$L_{-DMF}$ of bis(2,4-pentane dionato)nickel(II) (Ni(acac)$_2$; 283657-25G; Sigma-Aldrich Co. LLC.), and $2.49\times 10^{-1}$ mol/$L_{-DMF}$ of benzoic acid (204-00985, Wako Pure Chemical Industries, Ltd.), and also, the carrier obtained in step (1) was added in a concentration of 10 g/$L_{-DMF}$. Then, the liquid made by mixing the aforementioned components was subjected to dispersion using an ultrasonic disperser at room temperature (25° C.) for 30 minutes, to prepare a dispersion liquid. Note that the values with units "mol/$L_{-DMF}$" or "g/$L_{-DMF}$" indicate the proportion with respect to DMF which is the solvent of the dispersion liquid.

(3) Loading Step:

The volumetric flask containing the dispersion liquid was purged with argon gas, and while maintaining this state, was immersed in oil at room temperature, and the temperature of the dispersion liquid was raised to 120° C. at an oil temperature-rise rate of 5° C./minute. While keeping the oil temperature in the oil bath at 120° C., the liquid was heated to reflux for 48 hours.

(4) Solid-Liquid Separation Step:

The oil bath was then removed, and the liquid was cooled to room temperature and then filtered. Then, the filtered solid was washed five times with a mixed solvent of acetone and ethanol (mixed at a 1:1 volumetric ratio) and then once with a mixed solvent of water and ethanol (mixed at a 1:1 volumetric ratio), and then dried, to obtain an electrode catalyst loaded with a platinum-nickel alloy.

Examples 2 to 4

Electrode catalysts loaded with a platinum-nickel alloy were obtained similarly to Example 1, except that the oil temperature and/or the retention time in the loading step (3) in Example 1 were/was changed to the values shown in Table 1.

Examples 5 and 6

Electrode catalysts loaded with a platinum-nickel alloy were obtained similarly to Example 1, except that the oil temperature and the retention time in the loading step (3) and the concentration of the bis(2,4-pentane dionato)nickel(II) added in Example 1 were changed to the values shown in Table 1.

Comparative Example 1

This Comparative Example is an example in which a platinum-loaded electrode catalyst was produced according to the description of Patent Literature 1.

(1) Carrier Production Step:

The step was carried out as in Example 1.

(2) Electrode Catalyst Production Step:

Five milliliters (5 mL) of a $H_2PtCl_6$ solution (equivalent to 1 g of Pt) and 295 mL of distilled water were mixed and dissolved, then reduced by 15.3 g of $NaHSO_3$, and then diluted with 1400 mL of distilled water. A 5% NaOH aqueous solution was added, and then 35% hydrogen peroxide (120 mL) was dropped while keeping the pH at around 5, to obtain a liquid including a platinum colloid. Here, a 5% NaOH aqueous solution was added as appropriate, to maintain the pH of the liquid at around 5. The colloidal liquid prepared according to the above procedure contained 1 g of platinum. Then, 5.67 g of the carrier obtained in step (1) was added, and was mixed at 90° C. for 3 hours. Thereafter, the liquid was cooled and then subjected to solid-liquid separation. In order to remove chloride ions from the water-containing powder obtained by solid-liquid separation, the same was diluted again with 1500 mL of distilled water and boiled at 90° C. for 1 hour, and then the liquid was cooled and subjected to solid-liquid separation. This cleaning process was carried out four times. Finally, after solid-liquid separation, the powder was dried in ambient air at 60° C. for 12 hours. In this way, platinum including a non-stoichiometric noble metal oxide was loaded on the surface of the carrier. Then, this carrier was subjected to a heat treatment in a 4 vol % hydrogen atmosphere diluted by nitrogen at 80° C. for 2 hours, to thereby obtain a platinum-loaded electrode catalyst.

Comparative Example 2

This Comparative Example is an example in which an electrode catalyst loaded with a platinum-nickel alloy was produced according to the description of Patent Literature 1.

(1) Carrier Production Step:
The step was carried out as in Example 1.

(2) Electrode Catalyst Production Step:
Five milliliters (5 mL) of a $H_2PtCl_6$ solution (equivalent to 1 g of Pt) and 295 mL of distilled water were mixed and dissolved, then reduced by 15.3 g of $NaHSO_3$, and then diluted with 1400 mL of distilled water. A 5% NaOH aqueous solution was added, and then 35% hydrogen peroxide (120 mL) was dropped while keeping the pH at around 5, to obtain a liquid including a platinum colloid. Here, a 5% NaOH aqueous solution was added as appropriate, to maintain the pH of the liquid at around 5. The colloidal liquid prepared according to the above procedure contained 1 g of platinum. Then, 1.49 g of nickel nitrate hexahydrate (Ni$(NO_3)_2 \cdot 6H_2O$) was added, which was an amount such that the molar ratio Pt/Ni between Pt and Ni was 1. Then, 8.7 g of the carrier obtained in step (1) was added, and was mixed at 90° C. for 3 hours. Thereafter, the liquid was cooled and then subjected to solid-liquid separation. In order to remove chloride ions from the water-containing powder obtained by solid-liquid separation, the same was diluted again with 1500 mL of distilled water and boiled at 90° C. for 1 hour, and then the liquid was cooled and subjected to solid-liquid separation. This cleaning process was carried out four times. Finally, after solid-liquid separation, the powder was dried in ambient air at 60° C. for 12 hours. In this way, platinum including a non-stoichiometric oxide and nickel including a non-stoichiometric oxide were loaded on the surface of the carrier. Then, this carrier was subjected to a heat treatment in a 4 vol % hydrogen atmosphere diluted by nitrogen at 200° C. for 2 hours, to thereby obtain an electrode catalyst loaded with a platinum-nickel alloy.

It should be noted that this method, which involves dispersing a carrier in a liquid including a platinum-containing colloid and loading the colloid on the carrier as platinum-containing particles, as in Comparative Examples 1 and 2, is referred to as the colloidal method.

{Evaluation}

Diffraction angle 2θ at peak of (200) plane of platinum or platinum alloy:

The electrode catalysts obtained in the Examples and the Comparative Examples were each subjected to X-ray powder diffraction measurement (XRD), to find the diffraction angle 2θ at a peak of a (200) plane of platinum or platinum alloy. The respective diffraction angle values 2θ are shown in Tables 1 and 2.

The XRD measurement was performed by using RINT-TTR III from Rigaku Co., Ltd., employing Cu Kα (0.15406 nm; 50 kV; 300 mA) as the X-ray source.

Metallization Rate of Sn:

The electrode catalysts obtained in the Examples and Comparative Examples were each subjected to XPS measurement, to find the metallization rate of Sn. The Sn metallization rate values are shown in Tables 1 and 2.

For the XPS measurement, Versa Probe II from Ulvac-Phi, Inc. was used, under the following conditions: X-ray source: Al Kα monochromatic light (hv=1486.6 eV); pass energy: 55.0 eV; energy step: 0.1 eV; angle between sample and detector: 45°; sample analysis region: 0.1-mm-dia. circle; analytic software: Multipak.

Charge correction was performed, so that the peak top position of the main peak (binding energy of tin oxide) in the spectrum ascribable to the Sn 3 $d_{5/2}$ orbit was 486.7 eV. The metallization rate of Sn was found by curve-fitting the spectrum ascribable to the Sn 3 $d_{5/2}$ orbit. Peak separation was performed, considering the peak indicating the metallic bond state of the Sn element as the peak where the binding energy was above 484.5 eV and below 485.2 eV, and the others as peak(s) of an oxide state of Sn, and the respective areas were measured. The metallization rate of Sn was found therefrom from the calculation according to equation (1) below:

$$\text{Metallization rate of Sn (\%)} = R_{Sn\text{-}metal}/(R_{Sn\text{-}metal} + R_{Sn\text{-}oxide}) \times 100 \quad \text{(Eq. 1)}.$$

Pt load rate (mass %), Ni load rate (mass %), and molar ratio (Pt/Ni) between Pt and Ni:

The electrode catalysts obtained in the Examples and Comparative Examples were each subjected to measurement with an ICP mass spectrometer (ICP-MS), to find the Pt load rate (mass %), the Ni load rate (mass %), and the molar ratio (Pt/Ni) between Pt and Ni. The obtained values are shown in Tables 1 and 2.

Kinetically Controlled Current Density $j_k$ (mA/Cm$^2_{-Pt}$):

The electrode catalysts obtained in the Examples and Comparative Examples were each subjected to cyclic voltammetry (CV) and linear sweep voltammetry (LSV) using a rotating disk electrode, to find the kinetically controlled current density $j_k$ (mA/cm$^2_{-Pt}$). More specifically, the process was performed in the following order: electrode preparation; CV measurement; and ORR activity evaluation. The obtained kinetically controlled current density $j_k$ (mA/cm$^2_{-Pt}$) values are shown in Tables 1 and 2.

Electrode Preparation:

A 5-mm-dia. glassy carbon (GC) disk electrode was polished with a 0.05 μm alumina paste, and was then subjected to ultrasonic cleaning with pure water. A sample loaded with a platinum-nickel alloy was added to a 90 vol % ethanol aqueous solution and was dispersed with an ultrasonic homogenizer. The dispersion was applied onto the GC disk at such a density that the Pt metal amount was 12 μg$_{-Pt}$/cm$^2_{-GC}$ per unit area of the disk, and was dried at atmospheric temperature. After drying, a 5% Nafion (registered tradename) solution (274704-100 ML from Sigma-Aldrich Co. LLC.) was dropped onto the catalyst on the GC disk so that the film thickness was 50 nm, and was then dried at atmospheric temperature.

Cv Measurement:

Measurement was performed using an electrochemical measurement system HZ-7000 from Hokuto Denko Corp. A 0.1 mol/L $HClO_4$ aqueous solution was purged with $N_2$ for at least 1 hour, and then, using a silver-silver chloride electrode (Ag/AgCl) as a reference electrode, cleaning was performed 300 times within a potential range from −0.25 to 0.742 V (vs. Ag/AgCl) and at a sweep rate of 0.5 V/s. Thereafter, actual CV measurement was performed within a potential range from −0.25 to 0.74 V. The electrochemically active surface area (or electrochemical surface area; ECSA) was analyzed using the hydrogen adsorption wave observed at 0.4 V or lower.

ORR Activity Evaluation:

LSV was performed after purging the electrolytic solution ($HClO_4$ aqueous solution) used for the CV measurement with oxygen gas for at least 1 hour. Data were obtained for a total of six conditions while changing the rotation speed from 400 rpm to 2500 rpm, at a temperature of 25° C., within a potential range from −0.20 to 1.00 V (vs. Ag/AgCl) and at a sweep rate of 10 mV/s. The results were analyzed using the Koutecky-Levich plot, to obtain the value of the kinetically controlled current density $j_k$ (mA/cm$^2$) at 0.64 V (vs. Ag/AgCl).

cally controlled current density $j_k$ is low. For the electrode catalyst of Comparative Example 2 in which a platinum-nickel alloy is loaded on a carrier by the colloidal method, even though the diffraction angle 2θ at the peak of the platinum alloy is within a range from 46.5 to 48.0°, the Sn metallization rate is above 5% and the kinetically controlled current density $j_k$ is lower compared to the Examples.

INDUSTRIAL APPLICABILITY

According to the present invention, it is possible to easily produce an electrode catalyst having excellent catalytic performance such as kinetically controlled current density. Further, the electrode catalyst of the present invention has excellent catalytic performance such as kinetically controlled current density.

The invention claimed is:

1. A method for producing an electrode catalyst in which a platinum alloy of platinum and a transition metal is loaded on a tin oxide carrier, comprising:

a dispersion liquid preparation step of preparing a dispersion liquid by mixing (i) at least one type of solvent selected from the group consisting of sulfoxide compounds and amide compounds, (ii) a catalyst carrier powder comprising a tin oxide, (iii) a platinum compound, and (iv) a transition metal compound; and a loading step of heating the dispersion liquid to thereby load a platinum alloy of platinum and a transition metal on a surface of the catalyst carrier powder, wherein a heating temperature in said loading step is below 160° C.;

wherein said at least one type of solvent is present in said dispersion liquid in an amount of 30 to 99.9 mass % of a total mass of said dispersion liquid.

2. The method for producing an electrode catalyst according to claim 1, wherein said heating temperature in the loading step is at least 120° C.

3. The method for producing an electrode catalyst according to claim 1, wherein said at least one type of solvent is selected from the group consisting of dimethylsulfoxide, N-methyl-2-pyrrolidone, N-ethyl-2-pyrrolidone, N-propyl-2-pyrrolidone, N-hydroxyethyl-2-pyrrolidone, N,N-dimethylformamide, N-methylformamide, N,N-diethylformamide, N-ethylformamide, N,N-dimethylacetamide, and N,N-diethylacetamide.

4. An electrode catalyst in which a platinum alloy of platinum and a transition metal is loaded on a tin oxide carrier including tungsten, wherein:

TABLE 1

| | | Example 1 | Example 2 | Example 3 | Example 4 | Example 5 | Example 6 |
|---|---|---|---|---|---|---|---|
| Dispersion liquid preparation step | Load amount (g/L$_{DMF}$) | 10 | 10 | 10 | 10 | 10 | 10 |
| | Concentration (mol/L$_{DMF}$) Pt compound | $9.87 \times 10^{-3}$ | $9.87 \times 10^{-3}$ | $9.87 \times 10^{-3}$ | $9.87 \times 10^{-3}$ | $9.87 \times 10^{-3}$ | $9.87 \times 10^{-3}$ |
| | Ni compound | $7.40 \times 10^{-3}$ | $7.40 \times 10^{-3}$ | $7.40 \times 10^{-3}$ | $7.40 \times 10^{-3}$ | $3.23 \times 10^{-3}$ | $3.23 \times 10^{-3}$ |
| | Benzoic acid | $2.49 \times 10^{-1}$ | $2.49 \times 10^{-1}$ | $2.49 \times 10^{-1}$ | $2.49 \times 10^{-1}$ | $2.49 \times 10^{-1}$ | $2.49 \times 10^{-1}$ |
| Loading step | Oil temperature (° C.) | 120 | 130 | 145 | 160 | 160 | 175 |
| | Retention time (h) | 48 | 48 | 48 | 12 | 12 | 12 |
| Evaluation | 2θ (°) | 47.696 | 47.504 | 47.533 | 46.877 | 46.922 | 46.959 |
| | Sn metallization rate (%) | 3.5 | 2.0 | 1.8 | 4.4 | 3.9 | 4.1 |
| | Pt load rate (mass %) | 10.7 | 14.9 | 12.0 | 14.8 | 14.6 | 14.4 |
| | Ni load rate (mass %) | 1.54 | 2.03 | 1.54 | 1.04 | 1.04 | 1.03 |
| | Pt/Ni molar ratio | 2.09 | 2.21 | 2.34 | 4.27 | 4.22 | 4.21 |
| | $j_k$ (mA/cm$^2$)* | 0.77 | 0.71 | 0.65 | 0.58 | 0.56 | 0.58 |

*$j_k$: Evaluation value at 0.64 V vs. Ag/AgCl.

TABLE 2

| | | Comparative Example 1 | Comparative Example 2 |
|---|---|---|---|
| Evaluation | 2θ (°) | 46.245 | 47.405 |
| | Sn metallization rate (%) | 3 | 16 |
| | Pt load rate (mass %) | 14.6 | 10 |
| | Ni load rate (mass %) | 0 | 3 |
| | Pt/Ni molar ratio | — | 1 |
| | $j_k$ (mA/cm$^2$)* | 0.29 | 0.44 |

*$j_k$: Evaluation value at 0.64 V vs. Ag/AgCl.

The results in Tables 1 and 2 clearly show that, for the electrode catalysts of Examples 1 to 6 produced according to the production method of the invention, the diffraction angle 2θ at the peak of the platinum alloy in the aforementioned XRD is within a range from 46.5° to 48.0°, the Sn metallization rate is 5% or less, and also the kinetically controlled current density $j_k$ is high. In contrast, for the electrode catalyst of Comparative Example 1 in which platinum particles containing no nickel are loaded on a carrier by the colloidal method, even though the Sn metallization rate is 5% or less, the diffraction angle 2θ in XRD is below 46.5° because the catalyst does not contain nickel, and the kinetiin a diffraction pattern obtained by subjecting the electrode catalyst to an X-ray diffraction measurement, a diffraction angle 2θ at a peak of a (200) plane of the platinum alloy is from 46.5° to 48.0°;

a metallization rate of Sn, as defined by equation (1) below, in an analysis region on the electrode catalyst's surface and a vicinity of the surface as measured by X-ray photoelectron spectroscopy is 3.5% or less:

$$\text{metallization rate of Sn (\%)} = R_{Sn\text{-}metal}/(R_{Sn\text{-}metal} + R_{Sn\text{-}oxide}) \times 100 \quad \text{(Eq. 1)},$$

wherein $R_{Sn\text{-}metal}$ is an area that Sn metal occupies in a spectrum ascribable to the Sn $3d_{5/2}$ orbit as measured by X-ray photoelectron spectroscopy, and $R_{Sn\text{-}oxide}$ is an area that Sn oxide occupies in a spectrum ascribable to the Sn $3d_{5/2}$ orbit as measured by X-ray photoelectron spectroscopy; and the transition metal is at least one member selected from the group consisting of nickel, cobalt, iron, chromium, titanium, vanadium, manganese, copper, zinc and scandium; and wherein a molar ratio of platinum to said transition metal in said platinum alloy is at least 2.09 and at most 10.

5. The electrode catalyst according to claim 4, wherein the diffraction angle 2θ at the peak of the (200) plane of the platinum alloy is from 46.8° to 47.7°.

6. The electrode catalyst according to claim 4, wherein the transition metal is nickel, cobalt, iron, or chromium.

7. The electrode catalyst according to claim 4, wherein the tin oxide carrier further comprises fluorine.

* * * * *